March 13, 1934.  L. S. WOODHULL  1,950,710
REFRIGERATOR LEG
Filed June 20, 1932
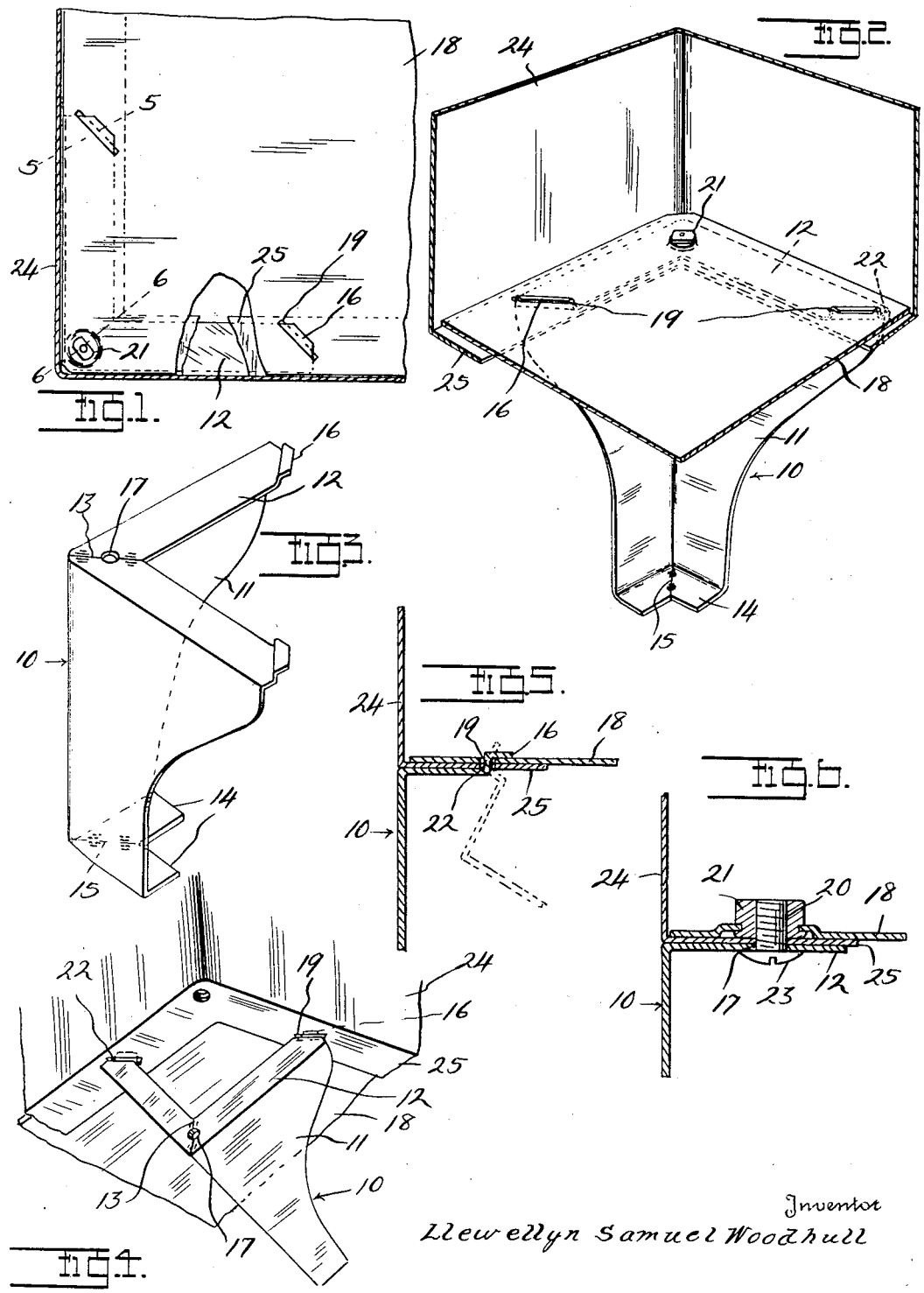
Inventor
Llewellyn Samuel Woodhull Patented Mar. 13, 1934

1,950,710

UNITED STATES PATENT OFFICE 1,950,710

REFRIGERATOR LEG

Llewellyn Samuel Woodhull, Detroit, Mich., assignor to Briggs Manufacturing Company, Detroit, Mich., a corporation of Michigan Application June 20, 1932, Serial No. 618,352

6 Claims. (Cl. 45—48)

This invention relates to leg attaching means, and more particularly to a structure of this type adapted for use on refrigerator cabinets and like structures.

An object of the invention is to provide a leg and attaching means therefor which is strong and durable and which may be economically manufactured and assembled with facility.

More particularly the invention contemplates a leg which may be secured in place by a single attaching screw or bolt. To this end the leg is provided with one or more tongues adapted to enter correspondingly spaced slots in the wall or panel to which the leg is to be attached, the panel and leg being also provided with registering apertures to receive therethrough a headed fastening element which cooperates with the tongues and slots to secure the leg in place.

The several objects, advantages and novel details of construction of the invention will be made more apparent as this description proceeds, especially when considered with the accompanying drawing, wherein Figure 1 is a fragmentary view partly in horizontal section and partly in plan view showing a corner of a cabinet or the like with the present invention associated therewith;

Figure 2 is a fragmentary perspective view of the structure illustrated in Figure 1;

Figure 3 is a perspective view of the leg member;

Figure 4 is a fragmentary perspective view showing the manner in which the leg is assembled with the cabinet;

Figure 5 is an enlarged detail sectional view taken substantially on the plane indicated by the line 5—5 in Figure 1, and Figure 6 is an enlarged detail sectional view taken substantially on the plane indicated by line 6—6 in Figure 1.

Referring now to the drawing, it will be noted that this improved leg structure is herein illustrated as associated with a box or cabinet, such, for instance, as is customarily used for refrigerators. However, this is for illustrative purposes only, as the leg may be employed with various other types of structures.

As seen particularly in Figure 3, the leg 10 is preferably formed of sheet metal and is of angular cross-section, thus providing two angular sides 11. Each side is provided with a laterally extending flange 12 at the upper end thereof, the adjacent edges of which are mitered and united along the seam line 13, by welding or the like. Thus, a continuous flange is provided at the upper end of the leg, arranged at a substantial right angle to the body of the leg. This tends to increase the rigidity of the leg structure.

Laterally extending flanges 14 are provided at the bottom, having their adjacent ends mitered and united along the seam line 15, this flange 14 constituting the floor engaging portion.

The upper flange 12 terminates at each end thereof in an offset portion, constituting a tongue or projection 16. These tongues 16 are arranged substantially parallel to the flange 12, but are offset as illustrated so that the plane of the tongues is spaced from the plane of the flange 12. The flange 12 at the corner of the leg is provided with an aperture 17.

The panel 18, to which the leg is to be attached, and which is here illustrated as the bottom of the cabinet or box, is provided with a pair of spaced slots 19 and with a threaded aperture 20. If, as illustrated, the panel 18 is of sheet metal and is thus of insufficient thickness to provide for sufficient threads, a clinch-on nut or the like 21 may be provided, in which the threaded aperture 20 is formed.

In attaching the leg 10 to the panel 18, as illustrated in Figure 4, it is only necessary to engage the tongues 16 in the slots 19, the tongues 16 extending through the slots in the manner clearly illustrated in Figure 5. When the tongues 16 are engaged in the apertures 19 to the extent of the shoulders 22 formed by the offsets, the aperture 17 of the leg is then in registration with the threaded aperture 20 of the panel, and the leg is secured in place by a single headed fastening element such, for instance, as a screw or bolt 23.

With this construction each leg may be secured in place entirely from the exterior of the box or cabinet after the latter is completely assembled, and may thus be removed and replaced without disturbing the cabinet proper.

As illustrated probably best in Figures 5 and 6, the side panels 24 of the cabinet or box can have the lateral lower edges 25 thereof brought in under the bottom panel 18 and provided with slots corresponding to the slots 19 in the bottom panel, whereupon, when the legs are secured in place as heretofore described, the tongues 16 and flange 12 will act to clamp or grip the side panel flanges 25 to the bottom panel 18, and thus assist in securing these panels together.

Obvious modifications may suggest themselves to those skilled in this art and to this end reservation is made to make such changes in the details of construction as may come within the purview of the accompanying claims.

What I claim as my invention is:

1. The combination with a panel having a pair of slots and a threaded aperture formed therein and arranged in triangular relation in the same plane, of a leg member having tongues engageable in said slots and an aperture adapted to register with said threaded aperture, and detachable means engaging said apertures for securing the leg member to said panel.

2. In combination with a panel having a pair of slots and a threaded aperture formed therein, of a leg member having flanges provided with tongues at their free ends adapted to engage in said slots and having an aperture formed therein adapted to cooperate with the aperture in said panel, and detachable fastening means fitting in said apertures to secure the leg member to the panel.

3. In combination, a panel having a pair of spaced slots formed therein and an aperture adjacent a corner of said panel, a leg member angular in cross section, flanges formed at the top of said leg member having their adjacent edges secured together, said flanges having at their free ends tongue members engageable in said slots and an aperture formed in the flanges at their secured together edges adapted to cooperate with the aperture formed in said panel, and a detachable fastening member extending through said apertures and cooperating with said tongues and slots to secure the leg member and panel together.

4. In combination, a panel formed with a pair of spaced slots and an aperture arranged in triangular relation in the same plane, a leg member having a pair of tongues engageable in said slots and an aperture registering with the panel aperture, and a detachable fastening element fitting in said apertures and cooperating with said slots and tongues to secure said leg in place.

5. In a structure of the class described, a leg member angular in cross section, a laterally extending flange on the upper end of said leg terminating in offset portions constituting tongues, said flange having an aperture formed therein adjacent the corner of said leg, a panel having spaced slots adapted to receive said tongues and a threaded aperture cooperating with the aperture in said leg member, and a headed fastening element extending through said cooperating apertures for holding the leg and panel together.

6. In combination, a pair of panels having overlapping portions provided with registering slots and an aperture, a leg member formed with an offset portion providing a shoulder and a tongue, said tongue engageable in said slots with said shoulder engaging the edge of the slot, and a fastening element engaging said leg and said aperture to secure said leg in place, the overlapping portions of said panels being clamped together by the tongue and adjacent portion of said leg.

LLEWELLYN SAMUEL WOODHULL.